C. F. HALL.
FLOWER-STAND.

No. 190,580. Patented May 8, 1877.

WITNESSES. INVENTOR.

UNITED STATES PATENT OFFICE.

CHARLES F. HALL, OF WEST TROY, NEW YORK.

IMPROVEMENT IN FLOWER-STANDS.

Specification forming part of Letters Patent No. 190,580, dated May 8, 1877; application filed April 17, 1877.

*To all whom it may concern:*

Be it known that I, CHARLES F. HALL, of West Troy, in the county of Albany and State of New York, have invented certain new and useful Improvements in Flower-Stands and Window-Gardens; and I do hereby declare the following to be a full, clear, and exact description of the invention, such as will enable others skilled in the art to which it pertains to make and use it, reference being had to the accompanying drawings, which form part of this specification.

My invention relates to an improvement in flower-pots or window-gardens; and it consists in a vessel or vase of any suitable shape or construction, which is of sufficient length to hold any desired number of pots, or be divided into a suitable number of compartments, each one of which has a perforated cone extending up into it, that is filled with some absorbent material, so that each compartment or pot will communicate directly with the water-reservoir below, and thus each plant will draw up the exact amount of water that is needed, and no more, as will be more fully described hereinafter.

Figure 1:
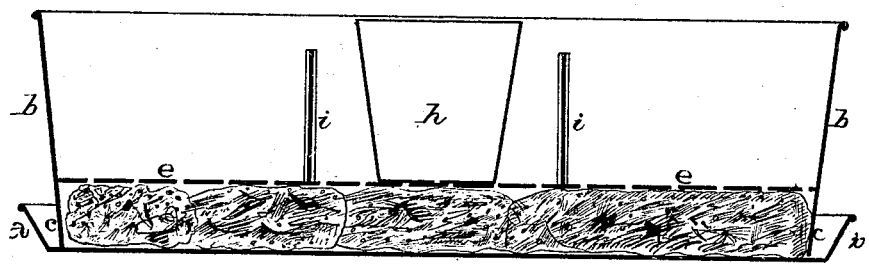
Figure 2:
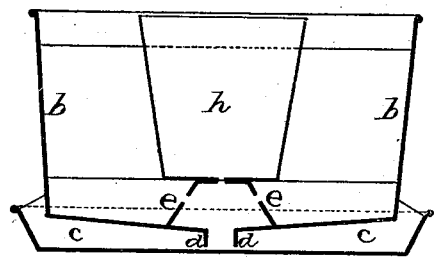

Figure 1 is a longitudinal vertical section, and Fig. 2 a vertical cross-section, of my invention.

$a$ represents the pan or water-reservoir, of any desired shape or depth, in which the vase or pot $b$, of corresponding shape, is set. Each end of the vase or pot has a foot or base, $c$, which raises the bottom of the vase a sufficient height above the bottom of the pan $a$. Projecting down below the bottom of the vase $b$ are the two flanges $d$, which extend down into the water, and in between these flanges is placed a mass of sponge or other absorbent material, which draws up the water to supply it to the plants in the vase or pot $b$. Inside of the vase is placed either one long or a series of sections of a perforated cone, $e$, which is also filled with sponge or other material, and this sponge draws the water from the sponge placed between the flanges, and feeds it directly to the plants in the pots $h$, that set on top of the cone $e$. The vase $b$ is divided into compartments by means of the partitions $i$, which can be readily removed, so as to make the compartments of any desired size; or the joints at the ends of the partition can be closed water-tight, so that each compartment will be entirely distinct.

The great object of my invention is to provide an ornamental little flower-garden for windows, in which a number of different kinds of flowers will grow, and each kind supply itself with just the exact amount of water that is needed, and no more. Some plants require almost double the amount of water that others do, and in order to have several kinds thrive well side by side, each one must get only just its requisite amount of water.

One great advantage of my invention is, that each part is made removable, and so can be cleaned in a few seconds, and thus the garden will always look neat and clean, and the pots $h$ may be changed at any time, so as to substitute new plants or flowers in the place of the old ones.

Having thus described my invention, I claim—

The combination of pan $a$, vase $b$, flanges $d$, cone $e$, partitions $i$, and pots $h$, substantially as shown and described, the cone and flanges being filled with sponge or other absorbent material, so as to supply each plant with the exact amount of water required, and no more.

In testimony that I claim the foregoing I have hereunto set my hand this 17th day of April, 1877.

CHARLES F. HALL.

Witnesses:
ROBT. M. BARR,
W. S. D. HAINES.